United States Patent [19]

Emerling et al.

[11] Patent Number: 5,823,870
[45] Date of Patent: Oct. 20, 1998

[54] METHOD AND APPARATUS FOR REDUCING EXHAUST FLAP MOVEMENT

[75] Inventors: Sandy J. Emerling, Troy, Mich.; Keith Potter, Mississauga, Canada

[73] Assignee: Chrysler Corporation, Auburn Hills, Mich.

[21] Appl. No.: 674,947

[22] Filed: Jul. 3, 1996

[51] Int. Cl.⁶ .................................................. B60H 1/26
[52] U.S. Cl. ................ 454/162; 137/512.15; 137/512.5; 137/857
[58] Field of Search .................................. 454/162, 164, 454/165; 137/512.15, 512.5, 857

[56] References Cited

U.S. PATENT DOCUMENTS

| | | | |
|---|---|---|---|
| 3,012,812 | 12/1961 | Miller | 296/44 |
| 3,831,628 | 8/1974 | Kintner et al. | 137/512.5 X |
| 4,628,963 | 12/1986 | Ishijima et al. | 137/857 |
| 4,920,865 | 5/1990 | Pasquali et al. | 454/164 |
| 5,010,918 | 4/1991 | Tolsma | 137/512.15 |
| 5,105,731 | 4/1992 | Kraus | 454/143 |
| 5,120,271 | 6/1992 | Shtanko | 454/137 |
| 5,167,574 | 12/1992 | Ikeda et al. | 454/164 |
| 5,194,038 | 3/1993 | Klomhaus et al. | 454/162 |
| 5,419,739 | 5/1995 | Lewis | 454/162 |
| 5,492,505 | 2/1996 | Bell et al. | 454/162 |
| 5,601,117 | 2/1997 | Lewis et al. | 454/162 X |

FOREIGN PATENT DOCUMENTS

| | | | |
|---|---|---|---|
| 650642 | 2/1951 | United Kingdom | 137/857 |

*Primary Examiner*—Harold Joyce
*Attorney, Agent, or Firm*—Thomas G. Pasternak

[57] ABSTRACT

An apparatus used with a vehicle one way ventilation exhaust valve with a plurality of flexible flaps is provided comprising a retainer with a frame and a plurality of flap retention members connected across U-shaped members attached to the frame such that when the apparatus is positioned proximate the valve, the retention members bias the flaps in the closed direction to prevent excessive movement of the flaps.

9 Claims, 3 Drawing Sheets

METHOD AND APPARATUS FOR REDUCING EXHAUST FLAP MOVEMENT

BACKGROUND OF THE INVENTION

FIELD OF THE INVENTION

The present invention relates to a method and apparatus for retaining flaps that are placed in air flow streams, and particularly for use with the exhaust valves used in an automobile ventilation system. The method and apparatus of the present invention minimizes excessive flap movement, and the attendant noise and vibration, during normal and severe vehicle maneuvering.

BACKGROUND OF THE INVENTION

Vehicle interiors are continually fed with outside air drawn in by the vehicle's ventilation, heating and cooling system. Interior air must be continuously vented, therefore, to maintain an interior pressure balance. This venting typically is done through a one-way exhaust valve. Backflow through the valve is undesirable because backflow air will not be conditioned to the desired temperature and humidity and may carry dust, water, and particulate.

The most common type of valve used to prevent backflow is a passively acting one-way device that vents excess interior pressure but closes off automatically to prevent backflow. A common passive valve uses one or more thin flexible rubber flaps that sit on an inclined frame, with gravity holding the flaps closed. Excess interior pressure lift the flaps to allow venting.

This conventional valve presents a problem, however, in that with normal and severe vehicle maneuvering, the flaps may jostle up and down, resulting in noise, vibration, and loss of sealability. The present invention provides a method and apparatus that solves that problem by preventing excessive movement of the flaps during normal and severe vehicle maneuvering, while at the same time allowing interior gases to escape in the normal fashion.

SUMMARY OF THE INVENTION

It is an object of the present invention to provide a method and apparatus for reducing the noise, vibration, and loss of sealability caused by excess movement of exhaust flaps in ventilation systems.

It is another object of the present invention to provide a method and apparatus for reducing flap movement that may be used with a variety of vehicles and applications.

It is still another object of the present invention to provide a method and apparatus which may be either attached to the vehicle body or to the exhaust valve itself.

Therefore, disclosed and claimed herein is a method and apparatus for reducing exhaust valve flap movement. The present invention biases the flaps of an exhaust valve in the closed position via a plurality of flap retention members located proximate the flaps, preventing excessive movement and noise, and water, dust, and exhaust intrusion while at the same time allowing interior gases to escape. The present invention may either be installed at the initial manufacture of the vehicle or afterwards, and the apparatus of the present invention may be attached to the valve itself or to the vehicle body.

The present invention comprises a vehicle one way ventilation exhaust valve with a plurality of flexible flaps further comprising a retainer comprising a frame comprising a top edge, a bottom edge, and two generally parallel side edges, a plurality of U-shaped members, each U-shaped member having a base and two legs, the U-shaped members attached to the frame proximate the top edge and the bottom edge, and a plurality of flap retention members, the flap retention members connected across the U-shaped members such that when the apparatus is positioned proximate the valve, the retention members bias the flaps in the closed direction to prevent excessive movement of the flaps.

DETAILED DESCRIPTION OF THE INVENTION

Figure 1:
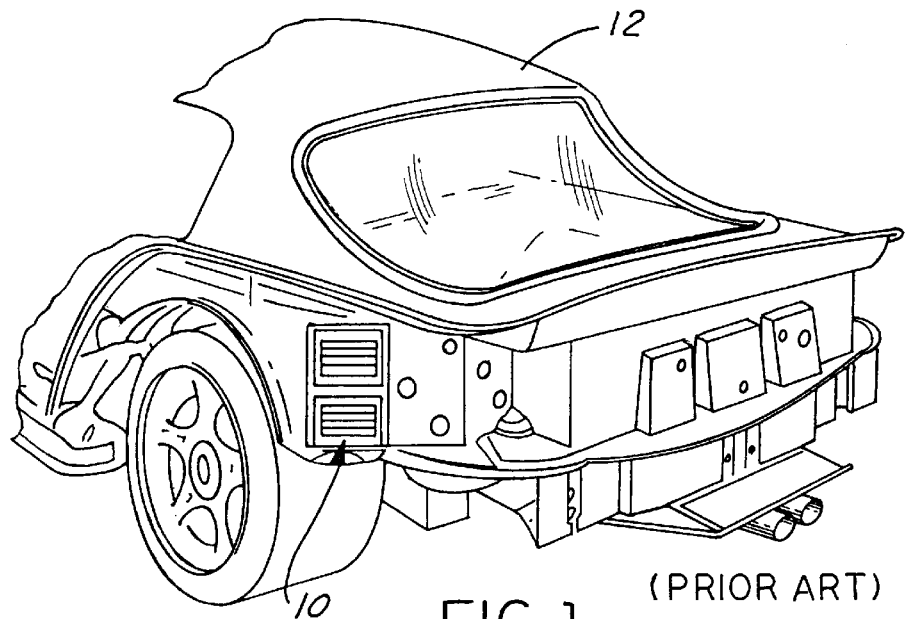
FIG. 1 shows a conventional flap exhaust valve installed in a vehicle.
Figures 2, 3:
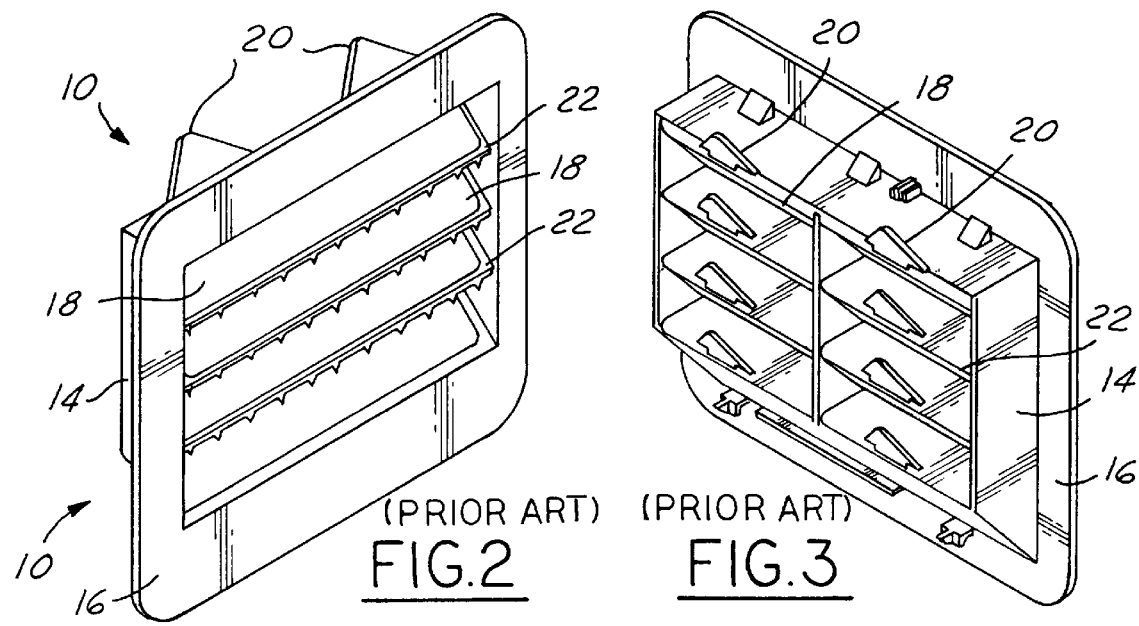
FIG. 2 shows a front perspective view of a conventional exhaust valve.
FIG. 3 shows a rear perspective view of a conventional flap exhaust valve.
Figure 4:
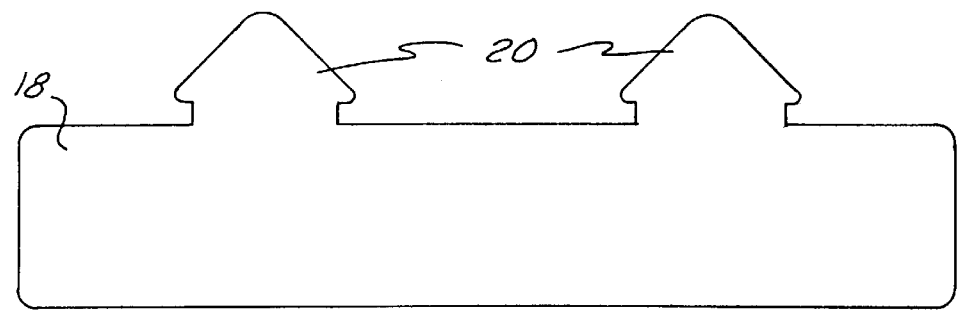
FIG. 4 shows a top view of a single flap of a conventional exhaust valve.

Turning to FIG. 1, FIG. 2, FIG. 3, and FIG. 4, a conventional exhaust valve 10 comprising the apparatus and method of the present invention is shown. The valve by itself (that is, not in combination with the improvement disclosed herein) is known in the art, for example, Chrysler Part No. 0484859 manufactured by Blue Water Plastics. The present invention may be used with other types of exhaust valves and in other applications as is appropriate, however. Exhaust valve 10 is installed at the termination of an exhaust duct of automobile 12. Exhaust air from the interior of the vehicle exhausts through the exhaust valve. Exhaust valve 10 comprises box frame 14 connected to flange 16. A plurality of flaps 18 are mounted via tabs 20 in diagonal racks 22 which extend across box frame 14. The flaps 14 are mounted via their tabs in the racks to hang in the slanted closed position due to gravity and lift with sufficient exhaust pressure.

Figure 5:
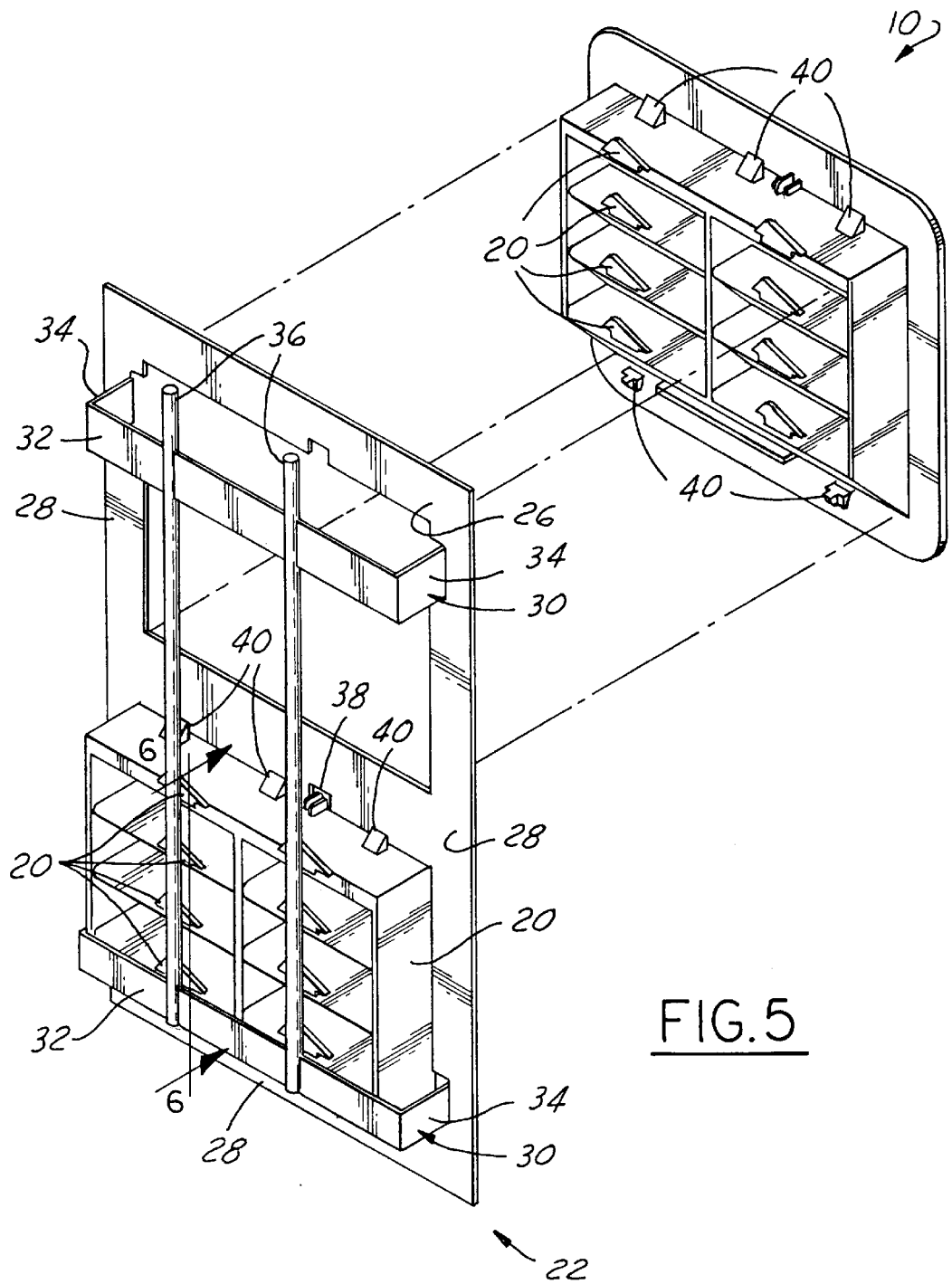
FIG. 5 shows an exploded view of the an exhaust valve comprising the apparatus of the present invention.
Figure 6:
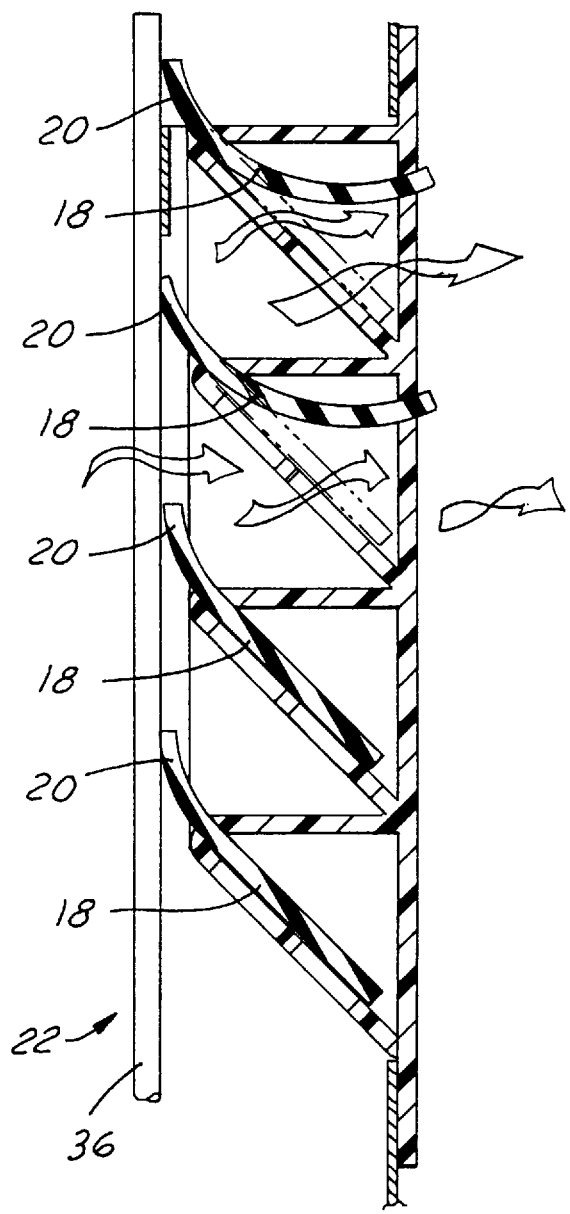
FIG. 6 shows a side cut away view of an exhaust valve comprising the apparatus of the present invention along section 6—6 of FIG. 5.

Turning to FIG. 5 and FIG. 6, the apparatus of the present invention is shown. Retainer 22 comprises frame 24 further comprising top edge 26, bottom edge 28 and side edges 28. The frame may be of any suitable shape, depending on the shape of the exhaust valve with which it is used. For example, it would be round in the case of a round exhaust duct. Retainer 22 further comprises a plurality of U-shaped members 30 connected across the side edges, each U-shaped member 30 having a base 32 and legs 34. A plurality of retention members 36, preferably two per flap, connect across the bases 32 of the U-shaped members 30.

As shown in FIG. 5 and FIG. 6, and in accordance with the method of the present invention, retainer 22 is provided and is brought into close proximity and connected to exhaust valve 10 so that retention members 36 contact tabs 20 of flaps 18, biasing the flaps in the closed direction. The retention members allow the flaps to lift as required for venting purposes, but prevent the jostling of the flaps caused by vehicle maneuvering by biasing the flaps in the close direction. The result is less noise, vibration, and loss of sealability, but otherwise normal valve operation.

In the embodiment shown, exhaust valve 10 snaps into place into retainer 22 via grooves 38 and tabs 40. The retainer may be held in contact with the exhaust valve by any means appropriate, however, and may be connected to the valve, the exhaust duct or the vehicle or may be an integral part of the valve itself if desired. The retainer may be attached either at initial vehicle manufacture or later as an after market part.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A vehicle one way ventilation exhaust valve assembly with a plurality of flexible flaps comprising:
    an exhaust valve;
    a retainer, said retainer comprising:
        a frame, said frame comprising a top edge, a bottom edge, and two generally parallel side edges;
        a plurality of U-shaped members, each U-shaped member having a base and two legs, said U-shaped members attached to said frame proximate said top edge and said bottom edge; and
        a plurality of flap retention members;
        said flap retention members connected across said U-shaped members;
    said retainer operatively associated with said valve such that said retention members bias said flaps in the closed direction to prevent excessive movement of said flaps.

2. The valve assembly of claim 1 wherein said retainer is attached to said valve.

3. The valve assembly of claim 1 wherein said retainer is attached to said vehicle.

4. An apparatus for use with a vehicle one way ventilation exhaust valve assembly with a plurality of flexible flaps comprising:
    an exhaust valve;
    a retainer, said retainer comprising:
        a frame, said frame comprising a top edge, a bottom edge, and two generally parallel side edges;
        a plurality of U-shaped members, each U-shaped member having a base and two legs, said U-shaped members attached to said frame proximate said top edge and said bottom edge; and
        a plurality of flap retention members;
        said flap retention members connected across said U-shaped members;
    said retainer operatively associated with said valve, such that said retention members bias said flaps in the closed direction to prevent excessive movement of said flaps.

5. The apparatus of claim 4 wherein said retainer is attached to said valve.

6. The apparatus of claim 4 wherein said retainer is attached to said vehicle.

7. A method for reducing the movement of the flaps of a vehicle one way ventilation exhaust valve assembly including an exhaust valve with a plurality of flexible flaps comprising:
    providing a retainer, said retainer comprising a frame, said frame comprising:
        a top edge, a bottom edge, and two generally parallel side edges;
        a plurality of U-shaped members, each U-shaped member having a base and two legs, said U-shaped members attached to said frame proximate said top edge and said bottom edge,
        a plurality of flap retention members;
        said flap retention members connected across said U-shaped members; and
    positioning said retainer proximate said valve such that said retention members bias said flaps in the closed direction to prevent excessive movement of said flaps.

8. The method of claim 7 wherein said retainer is attached to said valve.

9. The method of claim 7 wherein said retainer is attached to said vehicle.

* * * * *